(12) United States Patent
Shin

(10) Patent No.: US 12,005,871 B2
(45) Date of Patent: Jun. 11, 2024

(54) METHOD AND APPARATUS FOR BRAKING CONTROL FOR AUTONOMOUS PARKING

(71) Applicant: HYUNDAI MOBIS CO., LTD., Seoul (KR)

(72) Inventor: Beom Cheol Shin, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 276 days.

(21) Appl. No.: 17/684,795

(22) Filed: Mar. 2, 2022

(65) Prior Publication Data

US 2022/0306068 A1    Sep. 29, 2022

(30) Foreign Application Priority Data

Mar. 24, 2021    (KR) ......................... 10-2021-0037848

(51) Int. Cl.
| | |
|---|---|
| *B60T 15/04* | (2006.01) |
| *B60W 10/18* | (2012.01) |
| *B60W 30/06* | (2006.01) |
| *B60W 50/14* | (2020.01) |
| *B62D 15/02* | (2006.01) |

(52) U.S. Cl.
CPC ........... *B60T 15/041* (2013.01); *B60W 10/18* (2013.01); *B60W 30/06* (2013.01); *B60W 50/14* (2013.01); *B62D 15/0285* (2013.01); *B60T 2201/10* (2013.01); *B60W 2510/182* (2013.01); *B60W 2540/18* (2013.01)

(58) Field of Classification Search
CPC .. B60T 15/041; B60T 2201/10; B60W 10/18; B60W 30/06; B60W 50/14; B60W 2510/182; B60W 2540/18; B62D 15/0285
See application file for complete search history.

(56) References Cited

U.S. PATENT DOCUMENTS

| | | | |
|---|---|---|---|
| 7,529,600 B2 * | 5/2009 | Mori ..................... | B60T 8/1755 701/1 |
| 11,383,711 B2 * | 7/2022 | Suzuki ................ | B60W 10/184 |

* cited by examiner

*Primary Examiner* — Hung Q Nguyen
*Assistant Examiner* — Mark L. Greene
(74) *Attorney, Agent, or Firm* — NovoTechIP International PLLC

(57) ABSTRACT

A method and an apparatus for braking control for autonomous parking are disclosed. According to at least one embodiment, the present disclosure provides an apparatus for controlling braking of a vehicle to cause the vehicle to follow a target route generated in advance, including a biased braking control initiating unit configured to determine whether the target route satisfies a condition for initiating biased braking control, a biased braking amount determining unit configured to determine a ratio of a braking pressure to be applied to respective wheels of the vehicle based on the target route in response to determining that the target route satisfies the condition for initiating the biased braking control, and a control unit configured to perform braking control of the vehicle based on the ratio of the braking pressure.

11 Claims, 4 Drawing Sheets

METHOD AND APPARATUS FOR BRAKING CONTROL FOR AUTONOMOUS PARKING

CROSS-REFERENCE TO RELATED APPLICATIONS

This application is based on, and claims priority from, Korean Patent Application No. 10-2021-0037848, filed Mar. 24, 2021, the disclosure of which is incorporated by reference herein in its entirety.

TECHNICAL FIELD

The present disclosure in some embodiments relates to a method and an apparatus for braking control for autonomous parking.

BACKGROUND

The statements in this section merely provide background information related to the present disclosure and do not necessarily constitute prior art.

To enhance the vehicle drivers' safety and convenience, the development of technology is accelerating for grafting various sensors and electronic devices to vehicles. This has finally released the driver's intervention from a vehicle performing its delegated autonomous driving for road travel.

At the same time, interest is increasing in autonomous parking for saving drivers from difficulties with parking maneuvers even in the course of autonomous driving. Since the conventional autonomous parking system performs turning control using only steering, autonomous parking is bound to take a wide parking space due to a large radius of turn. Moreover, the limitation of the turning angle requires an improperly long time to complete parking and/or unparking.

SUMMARY

According to at least one embodiment, the present disclosure provides an apparatus for controlling braking of a vehicle to cause the vehicle to follow a target route generated in advance, including a biased braking control initiating unit, a biased braking amount determining unit, and a control unit. The biased braking control initiating unit is configured to determine whether the target route satisfies a condition for initiating biased braking control. The biased braking amount determining unit is configured to determine a ratio of braking pressure to be applied to respective wheels of the vehicle based on the target route in response to determining that the target route satisfies the condition for initiating the biased braking control. The control unit is configured to perform braking control of the vehicle based on the ratio of the braking pressure.

According to another embodiment, the present disclosure provides a method of controlling braking of a vehicle to cause the vehicle to follow a target route generated in advance, including the steps (not necessarily in the following order) of (i) determining whether the target route satisfies a condition for initiating biased braking control, (ii) determining a ratio of a braking pressure to be applied to respective wheels of the vehicle based on the target route in response to determining that the target route satisfies the condition for initiating the biased braking control, and (iii) performing braking control of the vehicle based on the ratio of the braking pressure.

REFERENCE NUMERALS

Figure 1:
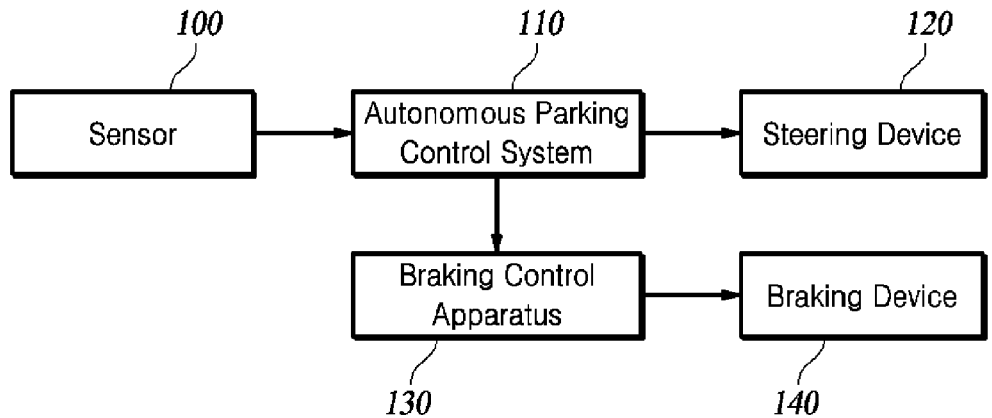
FIG. 1 is a schematic block diagram of an autonomous parking system according to at least one embodiment of the present disclosure.

| | |
|---|---|
| 10: autonomous parking system | 100: sensor unit |
| 110: autonomous parking controller | 120: steering device |
| 130: braking control apparatus | 140: braking device |
| 200: biased braking control initiating unit | |
| 210: biased braking amount determining unit | |
| 220: control unit | |

DETAILED DESCRIPTION

The present disclosure in some embodiments seeks to provide a braking control apparatus capable of enabling autonomous parking even in a relatively narrow parking space by reducing the turning radius of a vehicle, and reducing the time required for parking and/or unparking, and a control method thereof.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various terms such as first, second, A, B, (a), (b), etc., are used solely for the purpose of differentiating one component from others but not to imply or suggest the substances, the order, or sequence of the components. Throughout this specification, when parts "include" or "comprise" a component, they are meant to further include other components, not excluding thereof unless there is a particular description contrary thereto. The terms such as "unit," "module," and the like refer to units for processing at least one function or operation, which may be implemented by hardware, software, or a combination thereof.

FIG. 1 is a schematic block diagram of an autonomous parking system 10 according to at least one embodiment of the present disclosure.

As shown in FIG. 1, the autonomous parking system 10 may include a sensor 100, an autonomous parking controller 110, a steering device 120, a braking control apparatus 130, and a braking device 140 in whole or in part. Not all blocks shown in FIG. 1 are essential components, and some blocks included in the autonomous parking system 10 may be added, changed, or deleted in another embodiment.

The sensor 100 may be installed in a vehicle for detecting obstacles around the vehicle and for recognizing a parking space. For example, the sensor 100 may be implemented as an ultrasonic sensor, an image sensor, a lidar, a radar, or the like, but is not limited to these examples. The sensor 100 may further include a sensor for detecting a vehicle speed and/or a steering angle of a wheel for the braking control apparatus 130 to perform biased braking control.

The autonomous parking controller 110 may detect obstacles around the vehicle by using data received from the sensor 100. The autonomous parking controller 110 may additionally detect one or more objects necessary for parking, such as parking line, in addition to obstacles. The autonomous parking controller 110 may recognize a parking space based on the detected obstacle and/or parking lines and generates a parking route connecting the current location of the vehicle with the parking space. Additionally, when the vehicle is already parked in the parking space, the autonomous parking controller 110 may generate an unparking or exit route based on the detected obstacle and/or parking lines. Hereinafter, a parking route or an exit route is referred to as a target route.

The autonomous parking controller 110 may generate a steering control command for allowing the vehicle to follow the generated target route and transmits the generated steering control command to the steering device 120. Here, the steering device 120 may include but is not limited to, both or part of a steering motor and a steering gear.

In response to detecting an obstacle around the vehicle while the vehicle is being parked and/or unparked, the autonomous parking controller 110 may generate an obstacle warning. The autonomous parking controller 110 may vary the level or step of the obstacle warning generated according to the distance between the vehicle and the obstacle. For example, the closer the distance between the vehicle and the obstacle, the higher the generated obstacle warning may be.

For the vehicle to follow the generated target route and avoid the detected obstacle, the autonomous parking controller 110 may transmit information related to the target route and obstacle warning to the braking control apparatus 130. Here, the information related to the target route may include a turning angle of a turning route included in the target route. Additionally, the information related to the obstacle warning may include whether the obstacle warning is generated and the level or step of the generated obstacle warning.

Operations performed by the autonomous parking control apparatus 110 in the present disclosure are known technical matters, and thus detailed descriptions thereof will be omitted.

The braking control apparatus 130 may generate a braking control command for limiting the moving speed of the vehicle or stopping the vehicle to prevent the vehicle from colliding with an obstacle while parking and/or unparking.

Additionally, to enable the vehicle to follow the target route even when the turning angle of the target route is greater than the turning angle during maximum steering of the vehicle, the braking control apparatus 130 may generate the braking control command for causing a higher braking pressure to be applied to the selected wheel that depends on the target-route direction than a braking pressure on the other wheels. For example, the braking control apparatus 130 may generate a braking control command for controlling the braking device 140 to perform biased braking.

Figure 2:
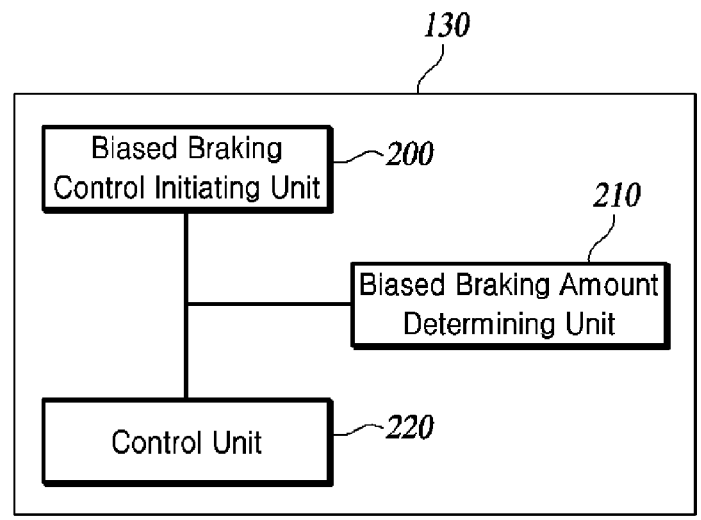
FIG. 2 is a schematic block diagram of a braking control apparatus according to at least one embodiment of the present disclosure.

FIG. 2 is a schematic block diagram of a braking control apparatus 130 according to at least one embodiment of the present disclosure.

Figure 3A:
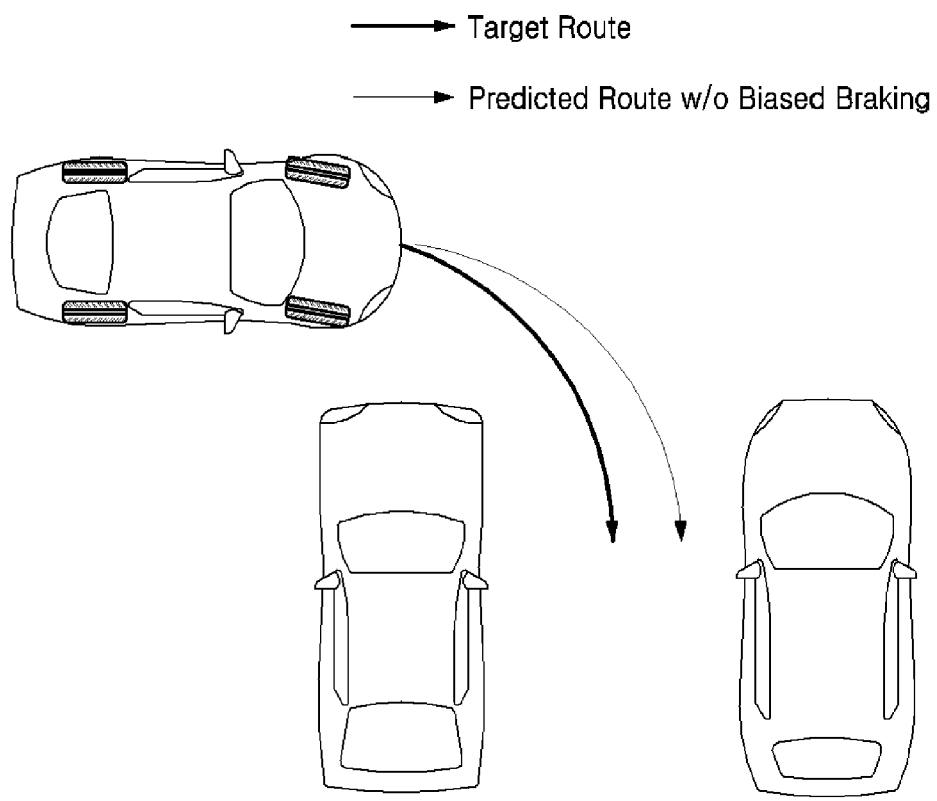
FIGS. 3A and 3B are views for illustrating a braking control method according to at least one embodiment of the present disclosure.
Figure 3B:
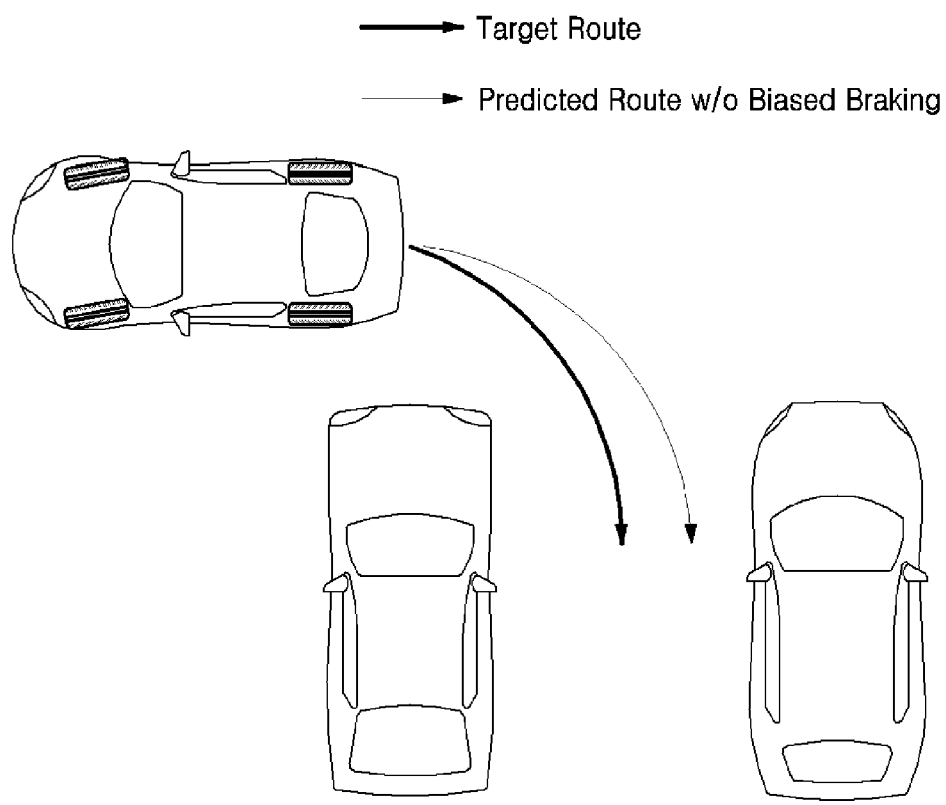

FIGS. 3A and 3B are views for illustrating a braking control method according to at least one embodiment of the present disclosure.

As shown in FIG. 2, the braking control apparatus 130 according to at least one embodiment of the present disclosure may include all or some of a biased braking control initiating unit 200, a biased braking amount determining unit 210, and a control unit 220. Not all blocks shown in FIG. 2 are essential components, and some blocks included in the braking control apparatus 130 may be added, changed, or deleted in another embodiment. FIG. 2 illustrates the components of the braking control apparatus 130 according to at least one embodiment, which control the operation of the braking device 140 for causing a higher braking pressure to be applied to the selected wheel that depends on the target-route direction relative to a braking pressure on the other wheel(s). It should be appreciated that the braking control apparatus 130 is merely illustrative and may have more or fewer components or different components than those illustrated, for implementing other functions.

The biased braking control initiating unit 200 may determine whether to initiate the biased braking control based on whether a biased braking control initiation condition is satisfied by vehicle function setting information and/or the target route-related information obtained from the autonomous parking controller 110.

The biased braking control initiating unit 200 may receive an input of vehicle function setting information from a user via a touch panel or at least one physical button for changing the setting values of various functions. Here, the vehicle function setting information may be on/off information for the autonomous parking function and the biased braking control function. For example, when the autonomous parking function or the biased braking control function is off, the biased braking control initiating unit 200 determines that the biased braking control initiation condition is not satisfied.

The biased braking control initiating unit 200 may be responsive to a prediction that steering control of the vehicle alone cannot follow the target route for determining that the biased braking control initiation condition is satisfied. For example, the steering control when assumed to be used alone without the biased braking control may lead to the vehicle's predicted route that fails to match the target route as shown in FIGS. 3A and 3B, which is an occasion that satisfies the biased braking control initiation condition.

The biased braking control initiating unit 200 according to at least one embodiment may compare the turning angle of the target route with the turning angle during maximum steering of the vehicle to determine whether the predicted route and the target route coincide. For example, when the turning angle of the target route is greater than a preset threshold angle, the biased braking control initiating unit 200 may determine that the biased braking control initiation condition is satisfied. Here, the preset threshold angle may mean the turning angle during maximum steering of the vehicle, and it may be set based on a steering angle of the front wheels during maximum steering of the vehicle, a dynamic radius of the vehicle, center of gravity of the vehicle, and the vehicle speed among other parameters. To this end, the biased braking control initiating unit 200 according to at least one embodiment stores a relational expression or a mapping table between the vehicle speed and the threshold angle of the vehicle.

The biased braking control initiating unit 200 according to another embodiment of the present disclosure may determine whether the predicted route matches the target route by comparing the steering angle of the front wheel during maximum steering of the vehicle or the current steering angle of the front wheel with the target steering angle of the front wheel required for the vehicle to follow the target route. For example, the biased braking control initiating unit 200 determines that the biased braking control initiation condition is satisfied when the target steering angle of the front wheel required for the vehicle to follow the target route is greater than the steering angle of the front wheel during maximum steering of the vehicle or the current steering angle of the front wheel. To this end, the biased braking control initiating unit 200 may obtain a target steering angle from the autonomous parking controller 110 and obtain a current steering angle from the sensor 100.

When biased braking control initiation condition is satisfied, the biased braking amount determining unit 210 may determine, based on the target route, the ratio of the braking pressure to be applied to each wheel of the vehicle.

The biased braking amount determining unit 210 may determine the ratio of the braking pressure to provide, among the vehicle wheels, the wheel selected according to the direction of the target route with a braking pressure applied higher than pressure for other wheels. Here, the selected wheel that depends on the target-route direction may be a wheel within the turning radius of the turning route included in the target route. For example, during perpendicular forward parking as shown in FIG. 3A, the biased braking amount determining unit 210 may determine such a ratio of the braking pressure that causes the higher braking pressure to be applied to the front wheel inside the turning radius, whereas during perpendicular reverse parking as shown in FIG. 3B, the biased braking amount determining unit 210 may determine such a ratio of the braking pressure that causes the higher braking pressure to be applied to the rear wheel inside the turning radius.

The biased braking amount determining unit 210 may determine such a ratio of the braking pressure that the more difference between the predicted route and the target route causes the higher braking pressure to be applied to the selected wheel that depends on the target-route direction than to other wheels. Here, to determine the ratio of the braking pressure according to the difference between the predicted route and the target route, the biased braking amount determining unit 210 may use the turning angle of the target route and the front-wheel steering angle of the vehicle.

Specifically, the biased braking amount determining unit 210 may determine the ratio of the braking pressure by taking into account the difference between the turning angle of the target route and the front steering angle of the vehicle, the speed of the vehicle, and the steering gear ratio of the vehicle. For example, when 1:α is the ratio of the braking pressure to be applied to the selected wheel that depends on the target-route direction to the braking pressure to be applied to each of the other wheels, α may be obtained based on Equation 1.

$$\alpha = \begin{cases} 1 - f(v, G) \times \left( \frac{\theta_{desire} - \theta_{vehicle}}{\theta_{desire}} \right) & \text{if } \theta_{desire} > \theta_{vehicle} \\ 1 & \text{else} \end{cases}$$

Equation 1

Here, α is a quotient of the braking pressure to be applied to each of other wheels divided by the braking pressure to be applied to the selected wheel, f is a preset weight function, v is the speed of the vehicle, G is the steering gear ratio of the vehicle, $\theta_{desire}$ is the turning angle of the target route, and $\theta_{vehicle}$ is the front-wheel steering angle of the vehicle. The biased braking amount determining unit 210 may obtain the turning angle of the target route from the autonomous parking controller 110 and obtain the vehicle speed and the front-wheel steering angle from the sensor 100 to determine the ratio of the braking pressure. Meanwhile, the preset weight function is a term for reflecting the speed of the vehicle and the steering gear ratio of the vehicle to the ratio of the braking pressure, and it may be variously modified according to embodiments. For example, the weight function may be set to have a larger value at a low speed than at a high speed in consideration of a passenger's riding comfort and vehicle stability.

On the other hand, the biased braking amount determining unit 210 may take into account the driving stability of the vehicle and the performance of the braking device 140 by limiting, to a preset threshold value, the minimum value of the quotient of the braking pressure for each of non-selected wheels divided by of the braking pressure for the selected wheel. For example, when αt is the preset threshold value, the quotient of the braking pressure to be applied to each of non-selected wheels divided by the braking pressure to be applied to the selected wheel may be obtained as shown in Equation 2.

$$\alpha = \begin{cases} \max\left(1 - f(v, G) \times \left( \frac{\theta_{desire} - \theta_{vehicle}}{\theta_{desire}} \right), \alpha_t\right) & \text{if } \theta_{desire} > \theta_{vehicle} \\ 1 & \text{else} \end{cases}$$

Equation 2

The biased braking amount determining unit 210 according to at least one embodiment may vary the ratio of the braking pressure for each wheel based on whether an obstacle warning is generated.

Specifically, when no obstacle warning is generated in the vehicle, the ratio of the braking pressure may be determined based on Equation 1 or 2, and when an obstacle warning is generated in the vehicle, a preset multiple may be used to determine the ratio of the braking pressure for each wheel. For example, responsive to an obstacle warning generated in the vehicle, the biased braking amount determining unit 210 may determine the ratio of the braking pressure to allow the braking pressure to be applied to the selected wheel to be equal to or less than a preset multiple of the braking pressure to be applied to each of the other wheels. Here, the preset multiple is a value defined by taking account of the driving stability of the vehicle and the performance of the braking device 140, and it may be the maximum value of the ratio of the braking pressure to be applied to the selected wheel that depends on the target-route direction to the braking pressures for the other wheels.

Additionally, the biased braking amount determining unit 210 may determine the ratio of the braking pressure so that the higher level or step of the obstacle warning causes the greater preset quotient of the braking pressure to be applied to the selected wheel that depends on the target-route direction of the target route divided by the braking pressures for each of the other wheels. For example, the present disclosure in some embodiments determines the ratios of the braking pressure as shown in Table 1 by the steps of the parking obstacle warning. To this end, the biased braking amount determining unit 210 may obtain information on the occurrence or non-occurrence of an obstacle warning and/or the step of the obstacle warning from the autonomous parking controller 110.

TABLE 1

| Step | Brake pressure applied to selected wheel:Brake pressure applied to other wheels |
|---|---|
| Step 1 | 1.5:1 |
| Step 2 | 2:1 |
| Step 3 | 3:1 |

The control unit 220 may perform braking control of the vehicle based on the ratio of the braking pressure determined by the biased braking amount determining unit 210.

In response to determining that the biased braking control function is set to off and the biased braking control initiation condition is not satisfied, the control unit 220 may control the braking device 140 to limit the speed of the vehicle by applying equal braking pressure to all wheels of the vehicle to limit the speed of the vehicle. On the other hand, in response to determining that the autonomous parking function is set to off and the biased braking control initiation condition is not satisfied, the control unit 220 does not perform braking control of the vehicle.

Figure 4:
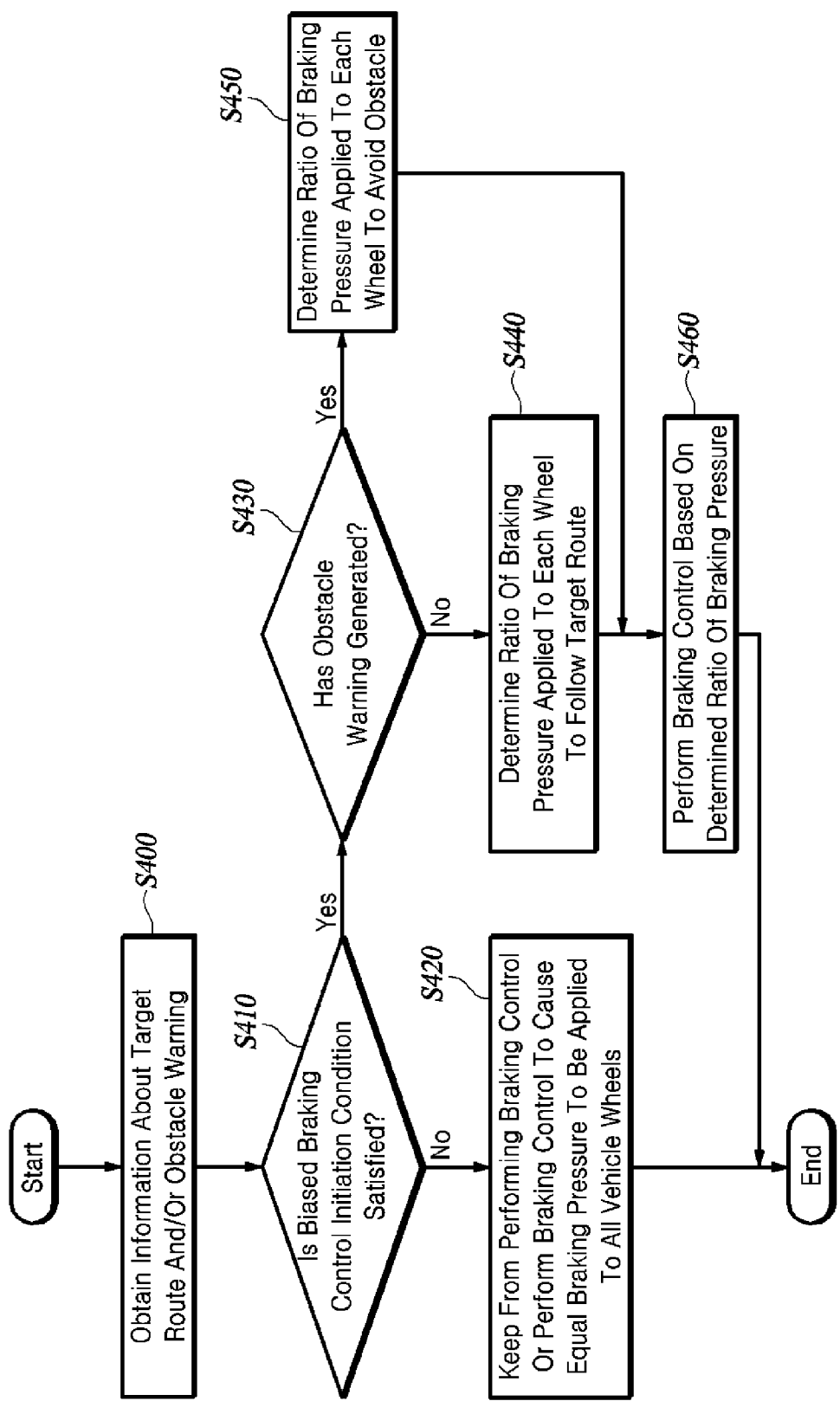
FIG. 4 is a flowchart of a braking control method according to at least one embodiment of the present disclosure.

FIG. 4 is a flowchart of a braking control method according to at least one embodiment of the present disclosure.

The braking control apparatus 130 obtains information related to the target route and/or obstacle warning from the autonomous parking controller 110 (S400).

The braking control apparatus 130 determines whether the vehicle function setting information and/or information related to the target route satisfies the biased braking control initiation condition (S410). For example, when the vehicle has both the autonomous parking function and the biased braking control function set to on, the braking control apparatus 130 may determine that the biased braking control initiation condition is satisfied if a steering control process used alone without the biased braking control leads the vehicle to a predicted route that does not coincide with the target route. At this time, when the turning angle of the target route is greater than the turning angle during maximum steering of the vehicle, the braking control apparatus 130 may determine that the predicted route does not coincide with the target route.

In response to determining that the biased braking control initiation condition is not satisfied, the braking control apparatus 130 keeps from performing the brake control or performs the brake control to cause an equal braking pressure to be applied to all wheels of the vehicle (S420). Specifically, when the autonomous parking function is set to off, braking control is not performed, and when the autonomous parking function is set to on but the biased braking control function is set to off, the braking control apparatus 130 may limit the speed of the vehicle by performing braking control to cause the same braking pressure to be applied to all wheels of the vehicle.

Upon determining that the biased braking control initiation condition is satisfied, the braking control apparatus 130 checks whether an obstacle warning has been generated in the vehicle (S430).

In response to determining that no obstacle warning is generated in the vehicle, the braking control apparatus 130 determines such ratio of the braking pressure for each wheel as to follow the target route (S440). For example, the braking control apparatus 130 may determine the braking pressure ratio by taking into account the difference between the turning angle of the target route and the front-wheel steering angle of the vehicle.

In response to determining that an obstacle warning is generated in the vehicle, the braking control apparatus 130 determines a ratio of the braking pressure for allowing each wheel to avoid the obstacle (S450). For example, the braking control apparatus 130 may determine the ratio of the braking pressure for allowing a first braking pressure, which is a braking pressure to be applied to selected wheel that depends on the target-route direction, to be less or equal to the preset multiple of a second braking pressure, which is a braking pressure to be applied to each of the other wheels. The ratio of the first braking pressure to the second braking pressure when the obstacle warning is generated may be higher than the ratio of the first braking pressure to the second braking pressure when the no obstacle warning is generated.

The braking control apparatus 130 performs braking control based on the determined ratio of the braking pressure (S460).

Although FIG. 4 presents the respective steps thereof as being sequentially performed, it merely instantiates the technical idea of some embodiments of the present disclosure. Therefore, a person having ordinary skill in the pertinent art could incorporate various modifications, additions, and substitutions in practicing the present disclosure by changing the sequence of steps illustrated by FIG. 4 or by performing one or more of the steps thereof in parallel, and hence the steps in FIG. 4 are not limited to the illustrated chronological sequences.

Various implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system includes at least one programmable processor coupled to receive and transmit data and instructions from and to a storage system, at least one input device, and at least one output device, wherein the programmable processor may be a special-purpose processor or a general-purpose processor. Computer programs, which are also known as programs, software, software applications, or code, contain instructions for a programmable processor and are stored in a "computer-readable recording medium."

The computer-readable recording medium includes any type of recording device on which data that can be read by a computer system are recordable. Examples of the computer-readable recording medium include non-volatile or non-transitory media such as a ROM, CD-ROM, magnetic tape, floppy disk, memory card, hard disk, optical/magnetic disk, storage devices, and the like. The computer-readable recording medium further includes transitory media such as data transmission medium. Further, the computer-readable recording medium can be distributed in computer systems connected via a network, wherein the computer-readable codes can be stored and executed in a distributed mode.

Various implementations of the systems and techniques described herein can be realized by a programmable computer. Here, the computer includes a programmable processor, a data storage system (including volatile memory, nonvolatile memory, or any other type of storage system or a combination thereof), and at least one communication interface. For example, the programmable computer may be one of a server, a network device, a set-top box, an embedded device, a computer expansion module, a personal computer, a laptop, a personal data assistant (PDA), a cloud computing system, and a mobile device.

According to some embodiments as described above, the present disclosure can provide the autonomous parking capability even in a relatively tight parking space with the reduced turning radius of the vehicle. Furthermore, according to at least one embodiment of the present disclosure, the vehicle is allowed to turn at a larger angle than in the related art, which shortens the time required for parking and/or unparking.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. An apparatus for controlling braking of a vehicle to cause the vehicle to follow a target route generated in advance, the apparatus comprising:
    a biased braking control initiating unit configured to determine whether the target route satisfies a condition for initiating biased braking control;
    a biased braking amount determining unit configured to determine a ratio of a braking pressure to be applied to respective wheels of the vehicle based on the target route in response to determining that the target route satisfies the condition for initiating the biased braking control; and
    a control unit configured to perform braking control of the vehicle based on the determined ratio of the braking pressure,
    wherein the biased braking amount determining unit is configured to, in response to an obstacle warning generated in the vehicle, determine the ratio of the braking pressure to allow a first braking pressure, which is a braking pressure to be applied to a wheel selected according to a direction of the target route, to be equal to or less than a preset multiple of a second braking pressure, which is a braking pressure to be applied to each of other wheels.

2. The apparatus of claim 1, wherein the biased braking control initiating unit is configured to determine that the condition for initiating the biased braking control is satisfied in response to a prediction that a steering control process used alone without the biased braking control will lead the vehicle to a predicted route that does not coincide with the target route.

3. The apparatus of claim 1, wherein the biased braking control initiating unit is configured to determine that the condition for initiating the biased braking control is satisfied when the target route has a turning angle that is greater than that of the vehicle during maximum steering of the vehicle.

4. The apparatus of claim 1, wherein the ratio of the braking pressure is determined based on a difference between a turning angle of the target route and a front-wheel steering angle of the vehicle.

5. The apparatus of claim 4, wherein the ratio of the braking pressure is determined based on:

$$\alpha = \begin{cases} 1 - f(v, G) \times \left( \dfrac{\theta_{desire} - \theta_{vehicle}}{\theta_{desire}} \right) & \text{if } \theta_{desire} > \theta_{vehicle} \\ 1 & \text{else} \end{cases},$$

where $\alpha$ is a quotient of a first braking pressure to be applied to each of other wheels divided by a second braking pressure to be applied to a wheel selected according to a direction of the target route, f is a preset weight function, v is a speed of the vehicle, G is a steering gear ratio of the vehicle, $\theta_{desire}$ is the turning angle of the target route, and $\theta_{vehicle}$ is the front-wheel steering angle of the vehicle.

6. The apparatus of claim 1, wherein the biased braking amount determining unit is configured to determine the ratio of the braking pressure such that a higher step of the obstacle warning causes a greater quotient of the first braking pressure divided by the second braking pressure.

7. The apparatus of claim 1, wherein the control unit is configured to, in response to determining that the target route does not satisfy the condition for initiating the biased braking control, apply an equal braking pressure to all wheels of the vehicle.

8. A method for controlling braking of a vehicle to cause the vehicle to follow a target route generated in advance, the method comprising:
    determining whether the target route satisfies a condition for initiating biased braking control;
    determining a ratio of a braking pressure to be applied to respective wheels of the vehicle based on the target route in response to determining that the target route satisfies the condition for initiating the biased braking control; and
    performing braking control of the vehicle based on the determined ratio of the braking pressure,
    wherein determining the ratio of the braking pressure comprises, in response to an obstacle warning generated in the vehicle, determining the ratio of the braking pressure to allow a first braking pressure, which is a braking pressure to be applied to a wheel selected according to a direction of the target route, to be equal to or less than a preset multiple of a second braking pressure, which is a braking pressure to be applied to each of other wheels.

9. The method of claim 8, wherein determining whether the target route satisfies the condition for initiating the biased braking control comprises determining that the condition for initiating the biased braking control is satisfied in response to a prediction that a steering control process used alone without the biased braking control will lead the vehicle to a predicted route that does not coincide with the target route.

10. The method of claim 8, wherein the ratio of the braking pressure is determined based on a difference between a turning angle of the target route and a front-wheel steering angle of the vehicle.

11. A method for controlling braking of a vehicle to cause the vehicle to follow a target route generated in advance, the method comprising:
    determining whether the target route satisfies a condition for initiating biased braking control;
    determining a ratio of a braking pressure to be applied to respective wheels of the vehicle based on the target route in response to determining that the target route satisfies the condition for initiating the biased braking control; and performing braking control of the vehicle based on the determined ratio of the braking pressure, wherein the ratio of the braking pressure is determined based on:

$$\alpha = \begin{cases} 1 - f(v, G) \times \left( \dfrac{\theta_{desire} - \theta_{vehicle}}{\theta_{desire}} \right) & \text{if } \theta_{desire} > \theta_{vehicle} \\ 1 & \text{else} \end{cases},$$

where $\alpha$ is a quotient of a first braking pressure to be applied to each of other wheels divided by a second braking pressure to be applied to a wheel selected according to a direction of the target route, f is a preset weight function, v is a speed of the vehicle, G is a steering gear ratio of the vehicle, $\theta_{desire}$ is a turning angle of the target route, and $\theta_{vehicle}$ is a front-wheel steering angle of the vehicle.

* * * * *